United States Patent
Strandemar et al.

(10) Patent No.: US 7,826,736 B2
(45) Date of Patent: Nov. 2, 2010

(54) CAMERA AND METHOD FOR USE WITH CAMERA

(75) Inventors: Katrin Strandemar, Rimbo (SE); Malin Ingerhed, Sollentuna (SE)

(73) Assignee: FLIR Systems AB (SE)

( * ) Notice: Subject to any disclaimer, the term of this patent is extended or adjusted under 35 U.S.C. 154(b) by 675 days.

(21) Appl. No.: 11/773,977

(22) Filed: Jul. 6, 2007

(65) Prior Publication Data

US 2009/0010633 A1   Jan. 8, 2009

(51) Int. Cl.
G03B 41/00 (2006.01)
(52) U.S. Cl. .................... 396/106; 396/333
(58) Field of Classification Search ............... 396/106, 396/322, 333
See application file for complete search history.

(56) References Cited

U.S. PATENT DOCUMENTS

| | | | | |
|---|---|---|---|---|
| 5,530,548 A | * | 6/1996 | Campbell et al. | 356/623 |
| 7,667,198 B2 | * | 2/2010 | Strandemar | 250/330 |
| 2006/0256229 A1 | * | 11/2006 | Wernersson | 348/348 |

FOREIGN PATENT DOCUMENTS

| | | |
|---|---|---|
| EP | 1299699 B1 | 8/2006 |
| JP | 08-210812 A | 8/1996 |
| JP | 2005-17336 A | 1/2005 |
| WO | WO-2006/060746 A2 | 6/2006 |

OTHER PUBLICATIONS

International Search Report and Written Opinion mailed Nov. 5, 2008, for PCT Application No. PCT/SE2008/050796 filed Jun. 27, 2008, 11 pages.

* cited by examiner

*Primary Examiner*—W. B. Perkey

(57) ABSTRACT

A camera comprising a first imaging part for capturing IR image data of a first field of view, said first imaging part comprising IR optics, a second imaging part for capturing visible light data of a second field of view at least partially overlapping the first field of view, said second imaging part comprising visible light optics, a laser pointer for providing a laser dot in the second field of view, and means for adjusting the first and second field of view relative to each other in dependence of the focusing distance of the first or second imaging part. The camera is arranged to determine the distance z between the camera and an object being imaged by means of the distance d, using the stored relationship. The distance z may be used to align the IR image and the visible light image.

8 Claims, 3 Drawing Sheets

CAMERA AND METHOD FOR USE WITH CAMERA

TECHNICAL FIELD

The present invention relates to a camera for producing IR images and visible light images and images comprising a mix of IR and visible light data, and to a method for use with such a camera.

BACKGROUND AND RELATED ART

In recent years methods and cameras have been proposed for combining IR images and visible light images in various ways, often referred to as image fusion. Typically, a camera will have an imaging part for capturing IR image data, another imaging part for capturing visible light image data and means for processing the image data in such a way that they can be displayed in the same image. Such functions may be helpful, for example, in identifying the position of a hot, or cold, object.

Typically, the field of view of the visible light image is greater than the field of view of the IR image. In any case the fields of view will differ, since the optical systems capturing the two images will not be placed in exactly the same position. This is a well known optical phenomenon called parallax. Hence, before displaying a fused, or blended, image the two images must be aligned. Also, since the resolution of the visible light image typically differs from that of the IR image, at least one image must be rescaled so the images will match each other.

EP patent 1 299 699 discloses a method of displaying visible light image data and IR image data in the same image, and a camera comprising imaging means both for IR radiation and visible light. The data can be combined in a number of different ways, for example, in dependence of the temperature in the respective pixels. This patent also mentions the need for correcting the parallax caused by the image capturing means for IR and visible light, respectively, being placed at a certain distance from each other. Two main methods of parallax correction are suggested: by optical means such as mirrors or by electronic means. How to correct the parallax by electronic means is not discussed in detail.

International patent application WO2006/060746 discloses parallax correction based on the distance to the object. The distance to the object is in turn determined by the focusing distance. The method suggested in WO 2006/060746 is to use a magnet mounted on the IR lens and a Hall sensor mounted in the optics housing, or vice versa, whereby the Hall sensor will measure the distance to the magnet and hence the focusing distance. The actual focusing of the camera is performed manually, in a way known per se, by turning a focus ring. As an alternative it is suggested to align the images by manually displacing one relative the other until they overlap correctly.

A number of ways of combining the IR and visible light image data are proposed in WO 2006/060746. For example, the visible image may be shown in a grey scale and the IR image superimposed on this image in colour. Alternatively, the visible light image may be displayed, but for pixels in which the temperature values exceed a certain threshold value the visible light pixels may be replaced by IR image pixels.

When aligning the IR and visible light images, however, it should be taken into account that the actual displacement of the images relative to each other is not simply a function of parallax, that is the displacement caused by the distance between the imaging parts for IR and visible light, respectively. Typically, there will also be an angle between the optical axes of the imaging parts.

Whereas a pure parallax error always decreases with the distance to the object, the actual displacement between the images in this case may decrease or increase with the distance to the object depending on the angle between the optical axes.

The present invention suggests an alternative method of aligning the visible light and IR images to the one proposed in WO2006/060746, in particular a method of taking into account the actual displacement of the images, not just the parallax error.

SUMMARY OF THE INVENTION

In a first aspect the present invention relates to a camera comprising a first imaging part for capturing IR image data of a first field of view, said first imaging part comprising IR optics, a second imaging part for capturing visible light data of a second field of view at least partially overlapping the first field of view, said second imaging part comprising visible light optics, a laser pointer for providing a laser dot in the second field of view, and means for adjusting the first and second field of view relative to each other in dependence of the focusing distance of the first or second imaging part, said camera comprising a memory unit having stored therein a relationship between the distance d between the laser dot and a fixed point in a visible light image of an object provided by the second imaging part and the distance z between the camera and the object and a processor arranged to determine the distance z between the camera and an object being imaged by means of the distance d, using the stored relationship.

The invention also relates to a method of determining a distance z between a camera and an object, said camera comprising at least a visible light imaging part and a laser pointer, comprising the following steps:

emitting a laser beam from the laser pointer of the camera towards to object to generate a laser spot on the object.

capturing a visible light image of the object, including the laser spot, using the visible light imaging part 13 of the camera.

determining the distance d between the laser spot and a predetermined point in the image, for example, the centre of the image.

determining the distance z between the camera and the object by means of the distance d, using a stored relationship between the distance z between the camera and the object and the distance d between the laser spot and a predetermined point in the image.

Hence, according to the invention the distance z to the object can be determined based on the position of the laser spot in the visible light image. The distance z to the object may, in turn, be used in several different ways. It may be used to focus the IR optics correctly. It may also be used to align the visible light image and the IR image properly, since it may be used to determine the displacement between the images. Further, the distance z itself may be of interest, and therefore may be output directly to the operator, for example, on the display.

One advantage of the inventive method is that the images can be aligned independently of whether or not they are correctly focused. This is particularly advantageous for objects that are difficult to focus on. The information about the distance to the object, that is obtained according to an embodiment of the inventive method can also be used to focus the camera.

Preferably, the processor is arranged to determine a displacement needed to align an IR image and a visible light image of the object, provided by the first and second imaging parts, respectively, on the basis of the distance d.

The relationship may be stored as an equation and at least one constant to be used in the equation.

Another aspect of the invention relates to a method of calibrating a camera comprising a first imaging part for capturing IR image data of a first field of view, said first imaging part comprising IR optics, a second imaging part for capturing visible light data of a second field of view at least partially overlapping the first field of view, said second imaging part comprising visible light optics, a laser pointer for providing a laser dot in the second field of view, and means for adjusting the first and second field of view relative to each other in dependence of the focusing distance of the first or second imaging part, said method comprising the steps of producing a first visible light image of an object at a first known distance and a second visible light image of the object at a second known distance from the camera.

determining the distance between the laser pointer and a predetermined point in the first visible image and in the second visible image, determining a general relationship between the distance d between the laser pointer and the predetermined point and the distance z between the camera and the object, based on the determined distances and the first and second known distances.

According to this other aspect the invention provides a calibration method that may be performed to enable the determining of the distance z according to the first aspect of the invention.

In a preferred embodiment the general relationship is stored in a memory unit in the camera.

The general relationship may be determined in the form of at least one approximation of at least one constant to be used in an equation describing the relationship between the distance d between the laser pointer and the predetermined point in the image and the distance z between the camera and the object. Typically, two constants will be needed.

The term focusing distance as used in this document refers to a position of the focusing lens relative to another fix point, for example another lens or a fix position in the objective.

DETAILED DESCRIPTION OF EMBODIMENTS

Figure 1:
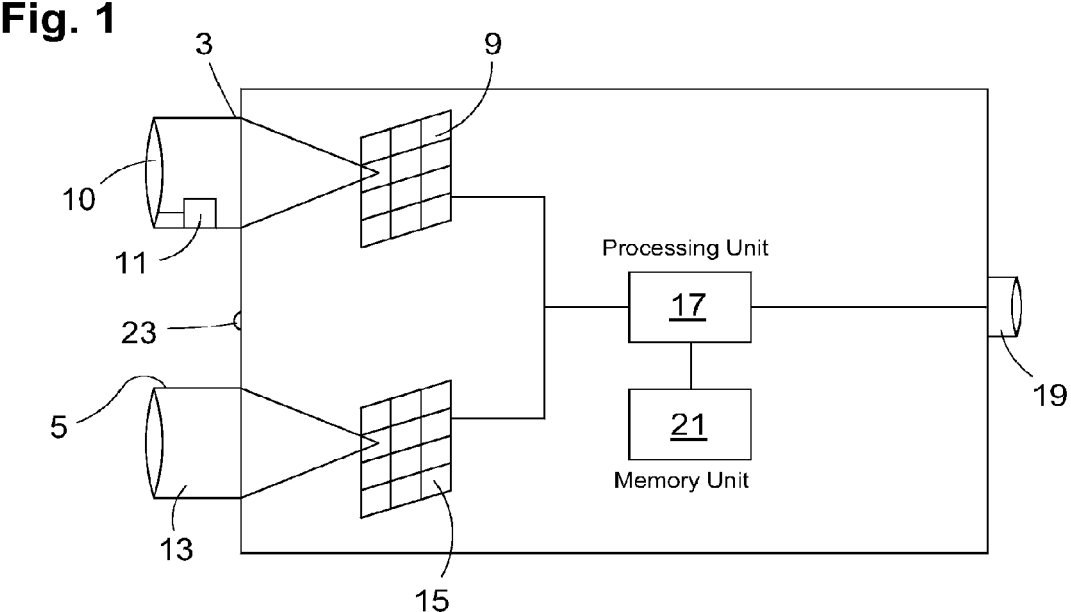
FIG. 1 shows a camera in which the aligning method according to the invention may be used

FIG. 1 illustrates schematically a camera 1 having a first imaging part 3 for capturing IR images and a second imaging part 5 for capturing visible light images. The first imaging part 3 comprises IR optics 7 that focuses incoming IR radiation onto an array 9 of IR sensing elements in a way known per se. Preferably the IR optics part comprises one or more IR lenses 10, one of which may be driven by a focusing motor 11. The second imaging part comprises visible light optics 13 for focusing the incoming visible light onto an array 15 of visible light sensing elements in a way known per se. The data registered by the arrays 9, 15 are forwarded to a processing unit 17 that processes the data to produce a suitable image, which may be a visible light image, an IR image or a blended image of IR and visible light images. The camera also preferably comprises a display unit 19 and at least one memory unit 21 for storing registered image data and/or processed images.

The camera is also provided with a laser pointer 23, known per se, which may be used to point out objects in the image. The first and second imaging parts 3, 5, and the laser pointer 23 are typically provided at known distances from each other, within a certain tolerance. Ideally, the optical axes should be parallel, but normally there will be a slight angle between them.

According to the invention the laser pointer is also used to determine the distance to the object, in order to align the IR and visible light images correctly. Ideally the laser pointer is mounted on the camera at a determined distance from the IR optics 7 and the visible light optics 13 and pointing in a direction parallel to their optical axes. In reality, as mentioned above, the distances, and the directions may vary within a certain tolerance. Therefore, the amount of displacement needed to align the two images will vary with the distance to the object not only as a function of the distances between the IR optics and the visible light optics 13 but also with the angle between them. The laser pointer must be strong enough to be detected in the visible image.

According to the invention, the processing unit 17 is in particular arranged to determine the displacement, resealing and other functions needed to align the IR image and the visible light image. A method of determining the displacement according to aspects of the invention will be discussed in the following. As will be understood by the skilled person, this method is preferably implemented in the form of computer code stored in or in connection to the processing unit.

Figure 2:
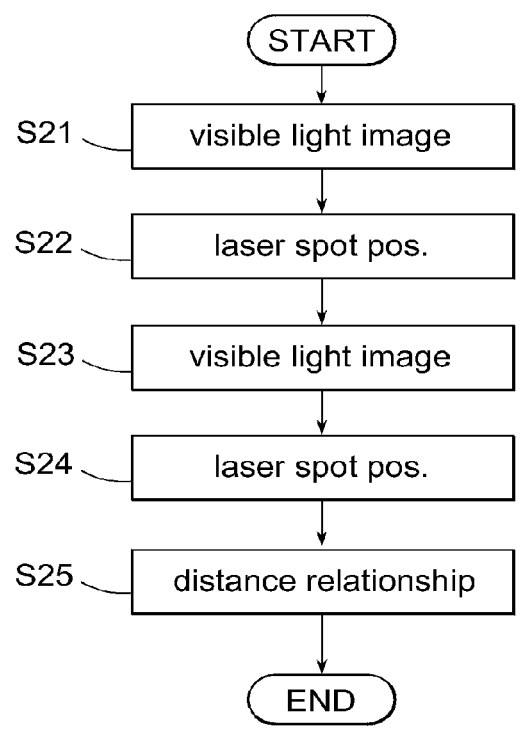
FIG. 2 is a flow chart of the calibration of a camera according to an embodiment of the invention.

The displacement of the laser point in the image can be determined empirically for example during calibration of the camera, in the following way as illustrated in FIG. 2:

Step S21: Produce a first visible light image of an object at a first known distance z1 from the camera.

Step S22: Determine the position of the laser pointer in the first visible image Step S23: Produce a second visible light image of an object at a second known distance z2 from the camera, typically relative to a predetermined point in the image.

Step S24: Determine the position of the laser pointer in the second visible image Step S25: For each of the positions of the laser pointer, determined in steps S2 and S4, determine the relationship between the distance in the image and the distance between the camera and the image. The positions of the laser pointer may also be used to estimate an equation or a curve for the displacement as a function of the distance to the object. This equation, or curve, is stored in a memory in the camera, for example, memory unit 21, and can be used to determine the displacement needed of the IR image and the visible light image in dependence of the distance z to the object as will be discussed in connection with FIG. 4.

Figure 3:
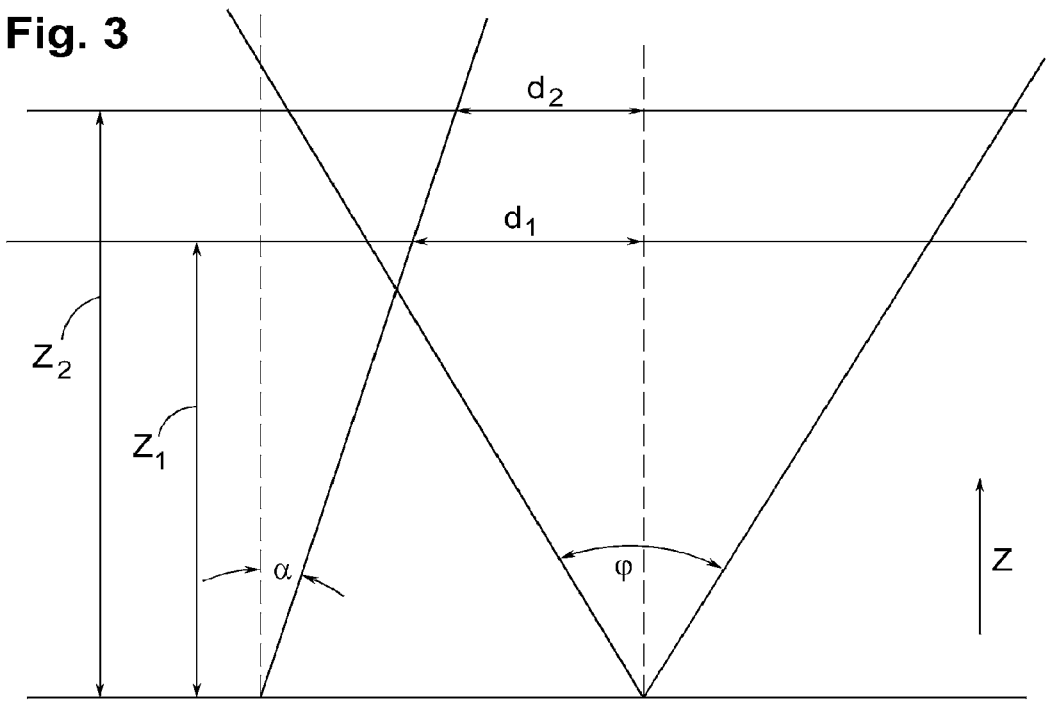
FIG. 3 illustrates the relationship between the optical axis of the visual imaging part and the laser beam in the camera according to FIG. 1.

FIG. 3 illustrates the field of view of the visible light imaging part 13 of the camera, represented as an angle φ. the optical axis of this imaging part shown as a dotted line. The laser beam is represented as a solid line 1. As can be seen the laser beam 1 is emitted at a distance from the optical axis of the visible light imaging part 13 and with a certain angle α relative to the optical axis. A dotted line parallel to the optical axis is provided to illustrate the angle α. The distances z1 and z2 mentioned in connection with FIG. 2 are shown in the FIG. 3. As can be seen, the distance between the point where the laser beam hits the object and the fixed point of the image varies with the distance z between the camera and the object. At the first distance z1 from the object, the distance between the laser point and the fixed point is a first object distance d1. At the second distance z2 from the object, the distance between the laser point and the fixed point is a second object distance d2.

Figure 5:
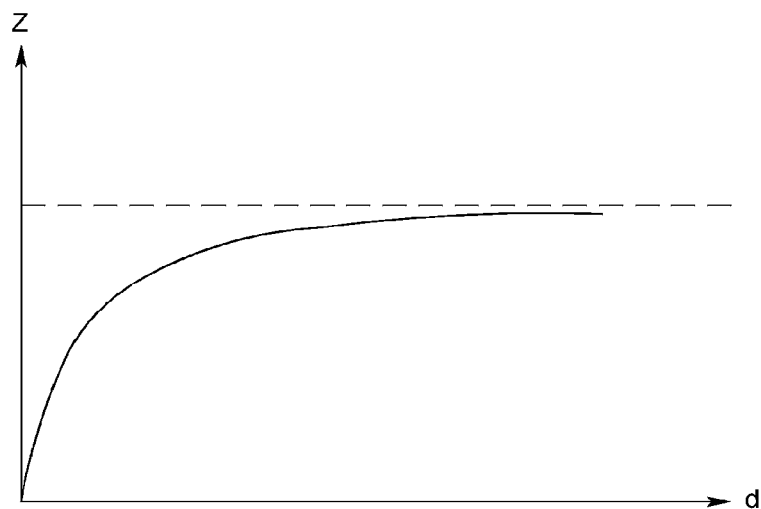
FIG. 5 is an example curve of the relationship between the distance d between the laser spot and the predetermined point in the image, and the distance to the object.

The relationship between a given distance z to the object and the distance d between laser spot and a predetermined point in the visual image is essentially as shown in FIG. 5 according to equation (1)

$$d = a/z + b \quad (1)$$

Hence, the distance z can be obtained as $$z = a/(d-b)$$

Here a and b are constants to be determined, d is the distance between the laser point and the fixed point in the image and z is the distance between the camera and the object. The constant a is dependent on the distance between the laser pointer and the optical system and the constant b is dependent on the angle between their optical axes. Hence, having determined a and b during calibration, the distance d between the laser point and the fixed point in the image can be used to determine the distance z between the camera and the imaged object during normal operation. This distance z will be the focusing distance if the laser pointer is pointing at the object that should be in focus. Hence, this information can be used for exact focusing of the camera. The correct focus position of the lens for a certain distance may vary with the temperature of the lens. Typically, however, an IR camera comprises means for measuring the temperature of the lens for other purposes. This temperature information can therefore be used together with the distance information, for example by the processing unit 17, to determine the correct focus distance of the lens 10.

To increase accuracy more than two images at different known distances may be produced and a linear curve may be adapted to the data in one of a number of ways known to the skilled person. This relationship is stored in the memory unit 21 for use by the processing unit 17 during imaging, for determining the displacement of the IR image relative to the visible light image, or vice versa.

Figure 4:
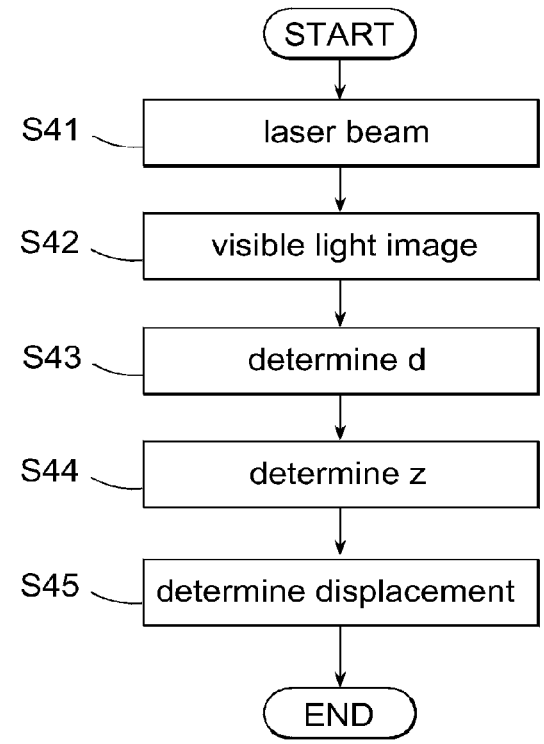
FIG. 4 is a flow chart of how to align the images according to an embodiment the invention.

FIG. 4 is a flow chart of how to align the IR and visible light images after calibration, during normal use of the camera.

Step S41: emit a laser beam from the laser pointer 23 of the camera towards to object to generate a laser spot on the object.

Step S42: capture a visible light image of the object, including the laser spot, using the visible light imaging part 13 of the camera.

Step S43: determine the distance d between the laser spot and a predetermined point in the image, for example, the centre of the image.

Step S44: use the distance d determined in step S43 to determine the distance z between the camera and the object.

Step S45: use the distance z to determine the amount of displacement needed to align a visible light image and an IR image taken of the object at the distance z as explained below.

The distance z can be used to determine the displacement needed of the IR image and the visible light image relative to each other, according to the equations $$Tx = ax/z + bx \quad (3)$$

$$Ty = ay/z + by \quad (4)$$

Here Tx indicates the horizontal displacement, Ty indicates the vertical displacement, ax, bx, ay and by are constants representing the horizontal and vertical displacement, respectively. Instead of the displacement, Tx and Ty may indicate a point in the visual light image in which, for example, the upper left corner, or the centre, or another point in the IR image should be placed.

The constants ax, bx, ay and by are determined for each camera in calibration proceedings before delivery. How to do this is well known in the art FIG. 5 shows an example curve illustrating the relationship between the distance d between the laser spot and the predetermined point in the image (along the horizontal axis) and the distance z between the camera and the object (along the vertical axis). The actual shape will vary depending on the constants a and b of Eqs. (1) and (2). As can be seen, the curve, shown as a solid line, will have a steep portion for low values of d and z and as d increases will approach a maximum value asymptotically. This maximum value is indicated in FIG. 5 as a dashed line. Two sets of values of d and z may be used to approximate a curve in order to provide estimates the constants a and b. This is done during calibration of the camera. To provide a more precise estimate, more sets of values of d and z may be used. Several methods for obtaining an approximate curve based on sets of values are known in the art and will not be discussed here.

The equations and constants needed to perform the calculations described above are preferably stored in the memory unit 21 or in another memory unit in the camera.

The invention claimed is:

1. A camera comprising:
    a first imaging part for capturing infrared (IR) image data of a first field of view, said first imaging part comprising IR optics;
    a second imaging part for capturing visible light data of a second field of view at least partially overlapping the first field of view, said second imaging part comprising visible light optics;
    a laser pointer for providing a laser dot in the second field of view;
    a memory unit having stored therein a relationship between a distance d between the laser dot and a fixed point in a visible light image of an object provided by the second imaging part and a distance z between the camera and the object, wherein said relationship comprises a first parameter dependent on the distance between the laser pointer and the optical system of the visible light optics and a second parameter dependent on the angle between the optical axes of said laser pointer and said optical system of the visible light optics;
    a processor arranged to determine the distance z based at least in part on the distance d, using the stored relationship; and
    a motor for adjusting at least one of the first field of view and the second field of view relative to each other based at least in part on the distance z determined by the processor.

2. A camera according to claim 1, wherein the processor is arranged to determine a displacement needed to align an IR image and the visible light image of the object, provided by the first and second imaging parts, respectively, based at least in part on the distance d.

3. A camera according to claim 1, wherein the relationship is stored as an equation and at least one constant to be used in the equation.

4. A method of calibrating a camera, said camera comprising a laser pointer and a visible light imaging part comprising visible light optics, said method comprising:

provide a laser dot in a field of view of the visible light imaging part using the laser pointer;

producing a first visible light image of an object at a first known distance and a second visible light image of the object at a second known distance from the camera;

determining a first distance between the laser dot and a predetermined point in the first visible image and a second distance between the laser dot and a predetermined point in the second visible image;

determining a relationship between the distance between the laser dot and the predetermined point and the distance between the camera and the object, based at least in part on the determined first and second distances and the first and second known distances, wherein said relationship comprises a first parameter dependent on the distance between the laser pointer and an optical system of the visible light optics and a second parameter dependent on the angle between the optical axes of said laser pointer and said optical system of the visible light optics.

5. A method according to claim 4, further comprising the step of storing the relationship in a memory unit in the camera.

6. A method according to claim 4, wherein the relationship is determined in the form of at least one approximation of a constant to be used in an equation describing the relationship between the distance between the laser pointer and the predetermined point in the image and the distance between the camera and the object.

7. A method of determining a distance between a camera and an object, said camera comprising a laser pointer and a visible light imaging part comprising visible light optics, said method comprising the steps of:

emitting a laser beam from the laser pointer of the camera towards an object to generate a laser spot on the object;

capturing a visible light image of the object, including the laser spot, using the visible light imaging part of the camera;

determining a distance d between the laser spot and a predetermined point in the image; and determining a distance z between the camera and the object based at least in part on the distance d, using a stored relationship between the distance z and the distance d, wherein said relationship comprises a first parameter dependent on the distance between the laser pointer and an optical system of the visible light optics and a second parameter dependent on the angle between the optical axes of said laser pointer and said optical system of the visible light optics.

8. A method according to claim 7, further comprising the step of determining the amount of displacement needed to align the visible light image and an IR image taken by an IR imaging part of the camera based at least in part on the determined distance z.

* * * * *